United States Patent
Dahl

(10) Patent No.: US 11,167,588 B2
(45) Date of Patent: Nov. 9, 2021

(54) WHEEL ASSEMBLY WITH LOW PROFILE OUTBOARD DRIVER LOCKING ARRANGEMENT

(71) Applicant: Aaron Dahl, Plainfield, IL (US)

(72) Inventor: Aaron Dahl, Plainfield, IL (US)

(73) Assignee: GKN Armstrong Wheels, Inc., Armstrong, IA (US)

( * ) Notice: Subject to any disclaimer, the term of this patent is extended or adjusted under 35 U.S.C. 154(b) by 869 days.

(21) Appl. No.: 14/696,142

(22) Filed: Apr. 24, 2015

(65) Prior Publication Data

US 2016/0311254 A1    Oct. 27, 2016

(51) Int. Cl.
  *B60B 25/14*  (2006.01)
  *B60B 25/12*  (2006.01)
  *B60B 25/20*  (2006.01)

(52) U.S. Cl.
  CPC .............. *B60B 25/14* (2013.01); *B60B 25/12* (2013.01); *B60B 25/20* (2013.01)

(58) Field of Classification Search
  CPC ..... B60C 15/0213; B60B 25/14; B60B 25/16; B60B 25/04; B60B 25/08; B60B 25/12
  See application file for complete search history.

(56) References Cited

U.S. PATENT DOCUMENTS

| | | | | |
|---|---|---|---|---|
| 1,609,099 A | * | 11/1926 | Antilotti | B60B 23/04 152/398 |
| 3,003,538 A | * | 10/1961 | Gerbeth | B60B 25/22 152/398 |
| 3,599,697 A | * | 8/1971 | Gerbeth | B60B 25/04 152/398 |
| 3,739,830 A | * | 6/1973 | Verdier | B60B 25/18 152/398 |
| 4,046,184 A | | 9/1977 | Diehl | |
| 4,649,978 A | | 3/1987 | McCoy | |
| 4,706,723 A | * | 11/1987 | Loeber | B60B 25/04 152/396 |
| 5,107,914 A | | 4/1992 | Yamoto et al. | |
| 6,311,749 B1 | * | 11/2001 | Taylor | B60B 25/04 152/410 |
| 6,786,259 B2 | * | 9/2004 | Vehar | B60B 25/18 152/410 |
| 2014/0182759 A1 | | 7/2014 | Phillis et al. | |
| 2017/0136815 A1 | * | 5/2017 | Cavanaugh | B60B 25/14 |

FOREIGN PATENT DOCUMENTS

JP    2014180902 A    9/2014

* cited by examiner

*Primary Examiner* — Jason R Bellinger
(74) *Attorney, Agent, or Firm* — Reinhart Boerner Van Deuren P.C.

(57) ABSTRACT

A wheel assembly is provided. The wheel assembly includes a rim configured to receive a tire of an off-road vehicle. The wheel assembly also includes a flange member slidably received on the rim. The flange member has a flange portion with a terminal end defining a first axial extent of the flange member. The wheel assembly also includes a locking ring radially and axially interposed between the rim and flange member. The wheel assembly also includes a locking arrangement mounted between the rim and the flange member which has a second axial extent. The second axial extent is substantially axially adjacent to the first axial extent.

15 Claims, 4 Drawing Sheets

WHEEL ASSEMBLY WITH LOW PROFILE OUTBOARD DRIVER LOCKING ARRANGEMENT

FIELD OF THE INVENTION

This invention generally relates to off-the-road vehicles, and more particularly to wheel assemblies therefore.

BACKGROUND OF THE INVENTION

Off-the-road (OTR) wheel assemblies are robust in their design. Typically they incorporate a central rim upon which a tire is installed. A flange is then installed on the rim to ultimately hold the tire on the rim and prevent the same from sliding off under pressure. The flange ordinarily is locked relative to the rim such that the same cannot rotate relative thereto using some form of a locking arrangement. Indeed, the driving torque applied to the OTR wheel is transferred to the rim. Without such a locking arrangement, it is possible for the rim to simply rotate relative to the flange and tire thereby preventing desired movement.

The Applicants have found, however, that such locking arrangements can extend axially outward from the flange and rim to such an extent that they may become caught on nearby objects. As one example, a piece of heavy equipment employing OTR wheels may have to navigate in tight corridors or spaces. The locking arrangement on each wheel protrudes to such an extent axially beyond the axial outermost surface of the flange that it may become caught on adjacent objects. Even worse, it is possible for the locking arrangement to become entirely sheared off of the flange and rim. Further, due to the aforementioned axial protrusion, it is also not uncommon for rocks and other debris to strike the locking arrangement during operation. Such rock strikes can also lead to failure in the field.

In contemporary OTR wheel designs, such locking arrangements typically protrude axially beyond an axial outermost edge of the flange by 20-30 millimeters. Furthermore, these locking arrangements typically are squared off such that they present edges which may easily interfere with adjacent objects. As such, there is a need in the art for wheel assembly with a low profile locking arrangement which overcomes the above problems.

The invention provides such a wheel assembly. These and other advantages of the invention, as well as additional inventive features, will be apparent from the description of the invention provided herein.

BRIEF SUMMARY OF THE INVENTION

In one aspect, embodiments of the invention provide a wheel assembly with a locking arrangement having a substantially reduced profile compared to prior designs. An embodiment of such a wheel assembly includes a rim configured to receive a tire of an off-road vehicle. The wheel assembly also includes a flange member slideably received on the rim. The flange member has a flange portion with a terminal end defining a first axial extent of the flange member. The wheel assembly also includes a locking ring radially and axially interposed between the rim and flange member. The wheel assembly also includes a locking arrangement mounted between the rim and the flange member which has a second axial extent. The second axial extent is substantially adjacent to the first axial extent in the axial direction.

In certain embodiments, the first and second axial extents are axially spaced less than about 10 mm from one another. In certain embodiments, the first and second axial extents are axially spaced about 2 mm from one another.

The rim may include a base portion and a contact portion. The contact portion has a reduced wall thickness relative to the base portion.

In certain embodiments, the locking ring has a generally V-shaped cross-section. The rim includes a base portion and a contact portion. The contact portion includes a locking ring groove adjacent an axial extent of the rim. The locking ring groove extends circumferentially around the contact portion. A portion of the locking ring is received in the locking groove.

In certain embodiments, the locking arrangement includes a radially outer locking bar, a radially inner locking bar, and a locking key received by both of the radially outer and inner locking bars such that rotation of the outer locking bar relative to the inner locking bar is prevented. The radially outer locking bar is fixedly mounted to the flange member. The radially inner locking bar is fixedly mounted to the rim.

The radially outer locking bar includes an open-sided aperture such that a portion of the locking key is axially insertable into the open-sided aperture. The radially inner locking bar includes a closed-sided aperture such that the locking key is radially insertable into the closed-sided aperture. Each of the radially outer and radially inner locking bars includes tapered portions which taper axially inwardly from respective axially outer-facing surfaces of the radially outer and radially inner locking bars.

In another aspect, embodiments of the invention provide a wheel assembly with a locking arrangement which substantially reduces shearing off of the locking arrangement by adjacent structures. An embodiment of such a wheel assembly includes a rim configured to receive a tire of an OTR vehicle. The wheel assembly also includes a flange member slidably received on the rim. The wheel assembly also includes a locking ring interposed between the rim and the flange member. The wheel assembly also includes a locking arrangement mounted between the rim and the flange member. The locking arrangement is configured to prevent relative rotation between the rim and the flange member. The locking arrangement includes tapered portions which taper axially inwardly from axially outermost faces of the locking arrangement.

In certain embodiments, the locking arrangement includes a radially outer locking bar, a radially inner locking bar, and a locking key received by both of the radially outer and inner locking bars such that rotation of the outer locking bar relative to the inner locking bar is prevented. The radially outer locking bar is fixedly mounted to the flange member. The radially inner locking bar is fixedly mounted to the rim. The radially outer locking bar includes an open-sided aperture such that a portion of the locking key is axially insertable into the open-sided aperture. The radially inner locking bar includes a closed-sided aperture such that the locking key is radially insertable into the closed-sided aperture.

According to this aspect, a first axial extent of the flange member is axially spaced from a second axial extent of the locking arrangement by less than about 10 mm from one another. In certain embodiments, the first and second axially extents are axially spaced about 2 mm from one another.

In yet another aspect, embodiments of the invention herein provide a method of assembling a wheel assembly for an OTR vehicle. The method comprises situating a tire on a rim. The method also comprises installing a flange member on said rim. The method also comprises axially and radially interposing a locking rim between the flange member and the rim. The method also comprises situating a locking arrangement between the flange member and the rim such that an axial extent of the flange member is substantially axially adjacent to an axial extent of the locking arrangement.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, FIGS. 1-6 illustrate one embodiment of a wheel assembly 10 according to the teachings of the present invention. As will be understood from the following, wheel assembly 10 advantageously overcomes existing problems in the art by presenting a low profile locking arrangement which has a substantially decreased axial protrusion than prior designs noted above. Further, the locking arrangement incorporates tapered surfaces so as to accommodate contact with adjacent structures.

Figure 1:
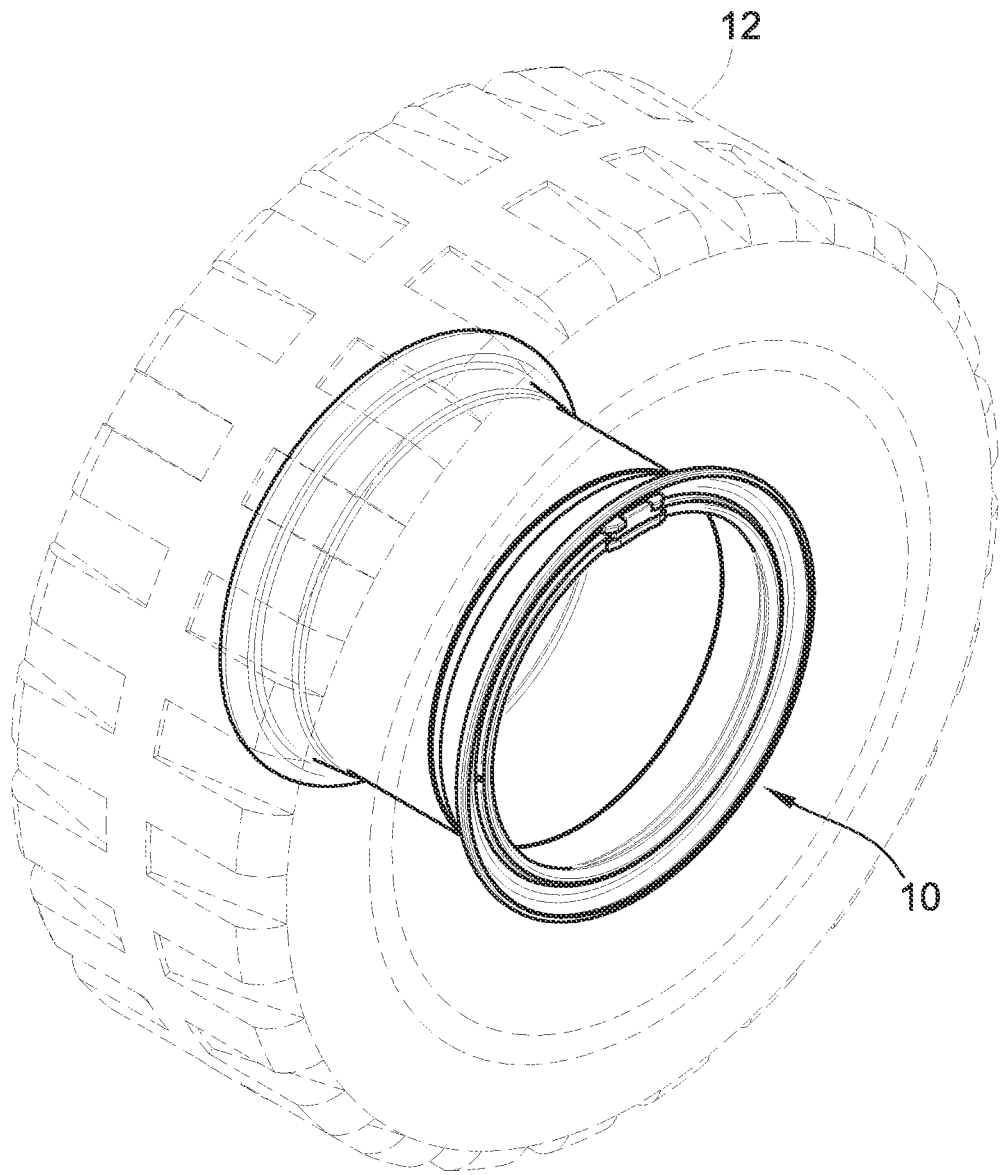
FIG. 1 is a prospective view of an OTR wheel assembly with a tire installed thereon.

Turning now to FIG. 1, the same illustrates an exemplary embodiment of wheel assembly 10 with a tire 12 installed thereon. While the tire illustrated is for OTR applications, the particular shape and style of tire 12 is purely for example only. Those of skill in the art will readily understand that wheel assembly 10 may be employed with various types and sizes of tires.

Figure 2:
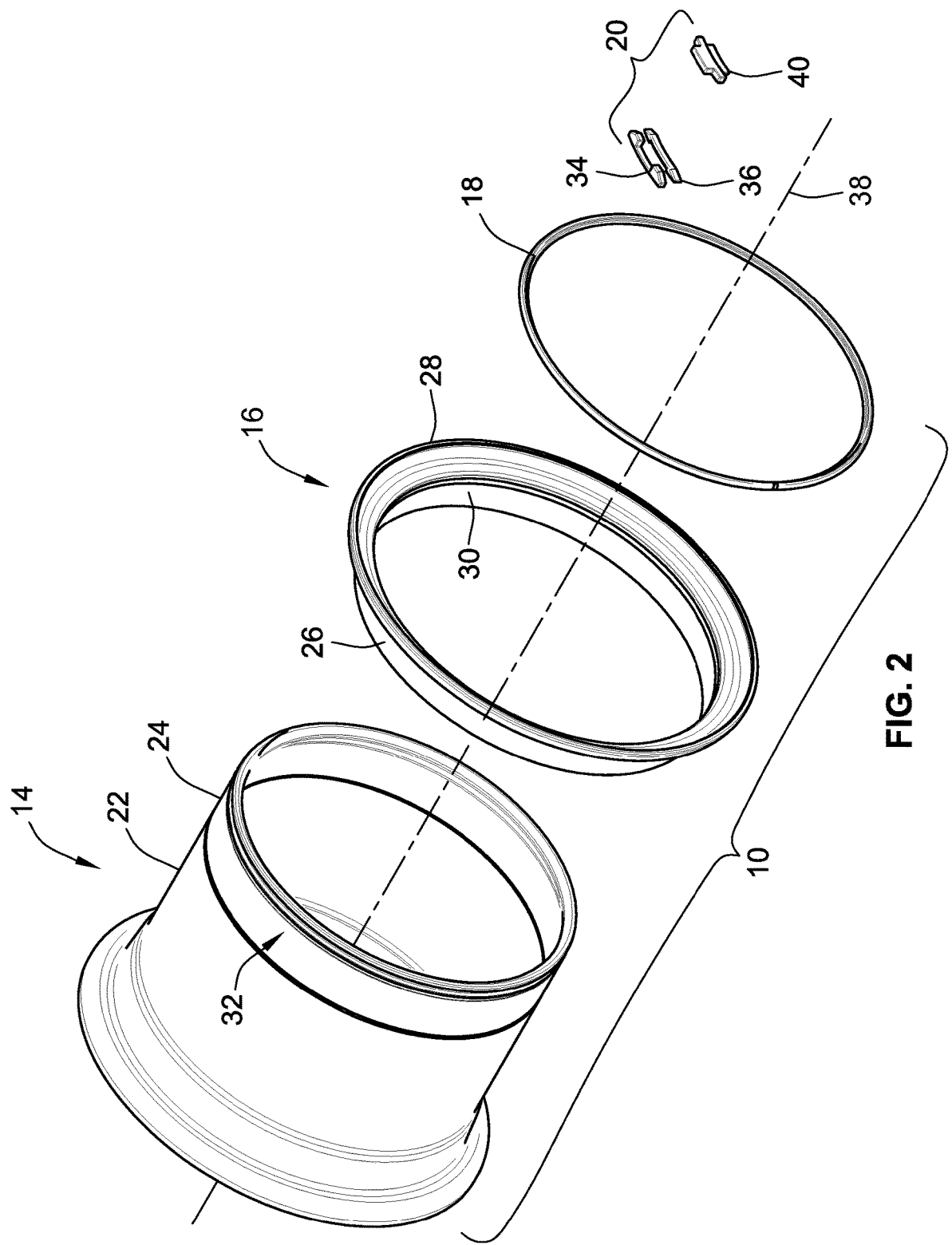
FIG. 2 is a prospective exploded view of the wheel assembly of FIG. 1.

Turning now to FIG. 2, wheel assembly 10 includes a rim 14, flange member 16, and a locking ring 18 installed between flange member 16 and rim 14. A locking arrangement 20 is provided between flange member 16 and rim 14 to prevent relative rotation between these elements. As can be seen in FIG. 2, the aforementioned elements are arranged along a longitudinal axis 38 of wheel assembly 10. For purposes of description, the term "axial" used herein is used in the context of axis 38. The term "radial" as used herein is used in the context of directions orthogonal to axis 38.

Turning first to rim 14, the same includes a base portion 22 with a contact portion 24 extending axially away from base portion 22. From inspection of FIG. 2, it will be clear that base portion 22 is thicker in the radial direction than contact portion 24. Furthermore, it will also be recognized that base portion 22 includes an integral flange at the leftmost end thereof shown in FIG. 2 against which tire 12 (See FIG. 1) abuts against.

Turning now to flange member 16, the same includes an axial portion 26 and a flange portion 28 integrally formed with axial portion 26. Axial portion 26 includes an interior contact surface 30 which, when flange member 16 is installed on rim 14, is in contact with an exterior contact surface 32 of rim 14. Flange member 16 is manufactured by coiling a plate steel, welding it into a ring, and then forming this ring to achieve the particular cross sectional shape illustrated. This is an advantage over prior designs, which typically involve a more complex hot rolling process first to achieve a desired cross sectional shape, then coiling, then welding.

Locking ring 18 is radially positioned between flange member 16 and rim 14 as discussed below. Locking ring 18 prevents flange member 16 from sliding axially off of rim 14 once these elements are assembled with tire 12 (See FIG. 1). With momentary reference to FIG. 4, locking ring 18 has a generally V-shaped cross section, and is radially and axially interposed between rim 14 and flange member 16 as shown.

Referring back to FIG. 2, locking arrangement 20 includes an outer locking bar 34 and a inner locking bar 36. Outer locking bar 34 is welded or otherwise fixedly attached to flange member 16. Inner locking bar 36 is welded or otherwise fixedly attached to rim 14. A key 40 is received by each of upper and inner locking bars 34, 36. As will be described below, key 40 prevents rotational movement of rim 14 relative to flange member 16 and vice versa.

Figure 3:
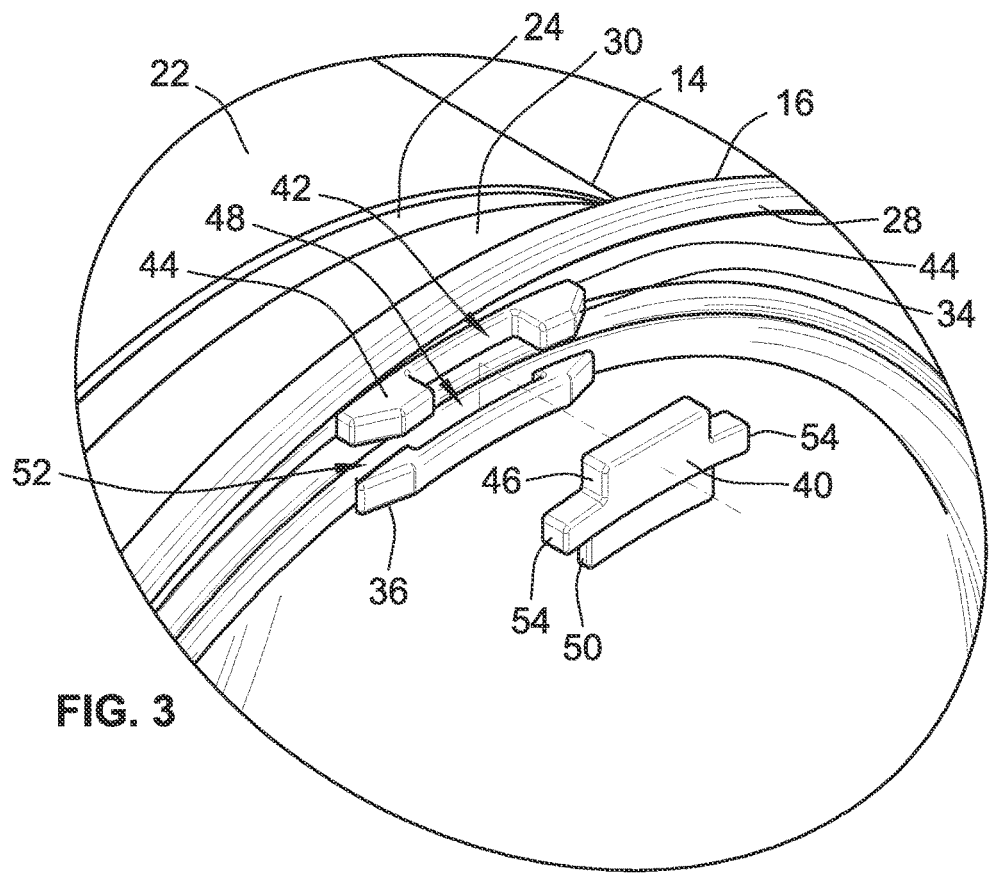
FIG. 3 is an exploded view of a locking arrangement of the wheel assembly of FIG. 1.

Turning now to FIG. 3, the aforementioned locking arrangement will be described in greater detail. As can be seen in FIG. 3, outer locking bar 34 includes a central open-sided aperture 42 defined between two projections 44 of outer locking bar 34. A first portion 46 of key 40 is received in aperture 42.

Inner locking bar also includes an aperture 48, but the same is not open-sided unlike aperture 42 of outer locking bar 34. Aperture 48 receives a second portion 50 of key 40. As can be seen from inspection of FIG. 3, first portion 46 of key 40 is thicker in the axial direction than second portion 50 of key 40. Among other things, this allows for correct orientation of key 40 between upper and inner locking bars 34, 36.

Still referring to FIG. 3, a radial gap 52 is defined between upper and inner locking bars 34, 36 as shown. First portion 46 of key 40 includes side projections 54 which are positioned within radial gap 52. Side projections 54 deter unwanted movement of key 40 within aperture 42, 48 once fully installed.

Figure 4:
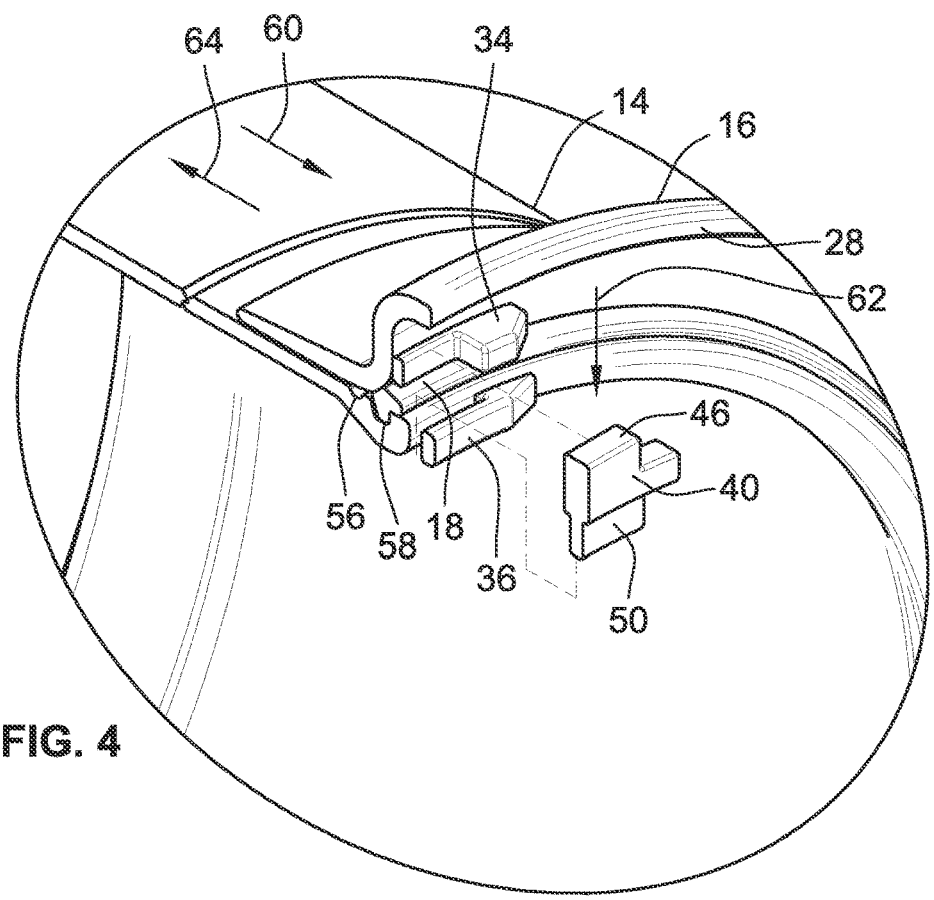
FIG. 4 is a prospective cross-section of the exploded view shown in FIG. 3.

Turning now to FIG. 4, a brief description of the assembly of wheel assembly 10 will be provided, including the installation of key 40. First, a tire 12 (See FIG. 1) is slid along first linear direction 60 shown in FIG. 4. Thereafter, flange member 16 is installed upon rim 14 by sliding the same in first linear direction 60. Flange member 16 is slid in first linear direction 60 such that it compresses tire 12 (See FIG. 1) to allow for placement of locking ring 18 within locking ring groove 58 shown in FIG. 4).

Thereafter, second portion 50 of key 40 is installed within aperture 48 (See FIG. 3) of inner locking bar 36 sliding the same in the radial direction along second linear direction 62 shown in FIG. 4. Once seated within aperture 48 (See FIG. 3) the force applied against flange member 16 to compress tire 12 (See FIG. 1) is released to allow flange member 16 to slide in third linear direction 64 relative to rim 14 until it abuts locking ring 18. The pressure P applied by tire 12 is such that it seats flange member 16 against locking ring 18 as shown in FIG. 4. As this occurs, first portion 46 of key 40 is trapped between projections 44 (See FIG. 3) of outer locking bar 34. As will be readily understood from the foregoing description and inspection of FIGS. 3 and 4, this results in a locking arrangement which prevents rotational movement of rim 14 relative to flange member 16 and vice versa.

Figure 5:
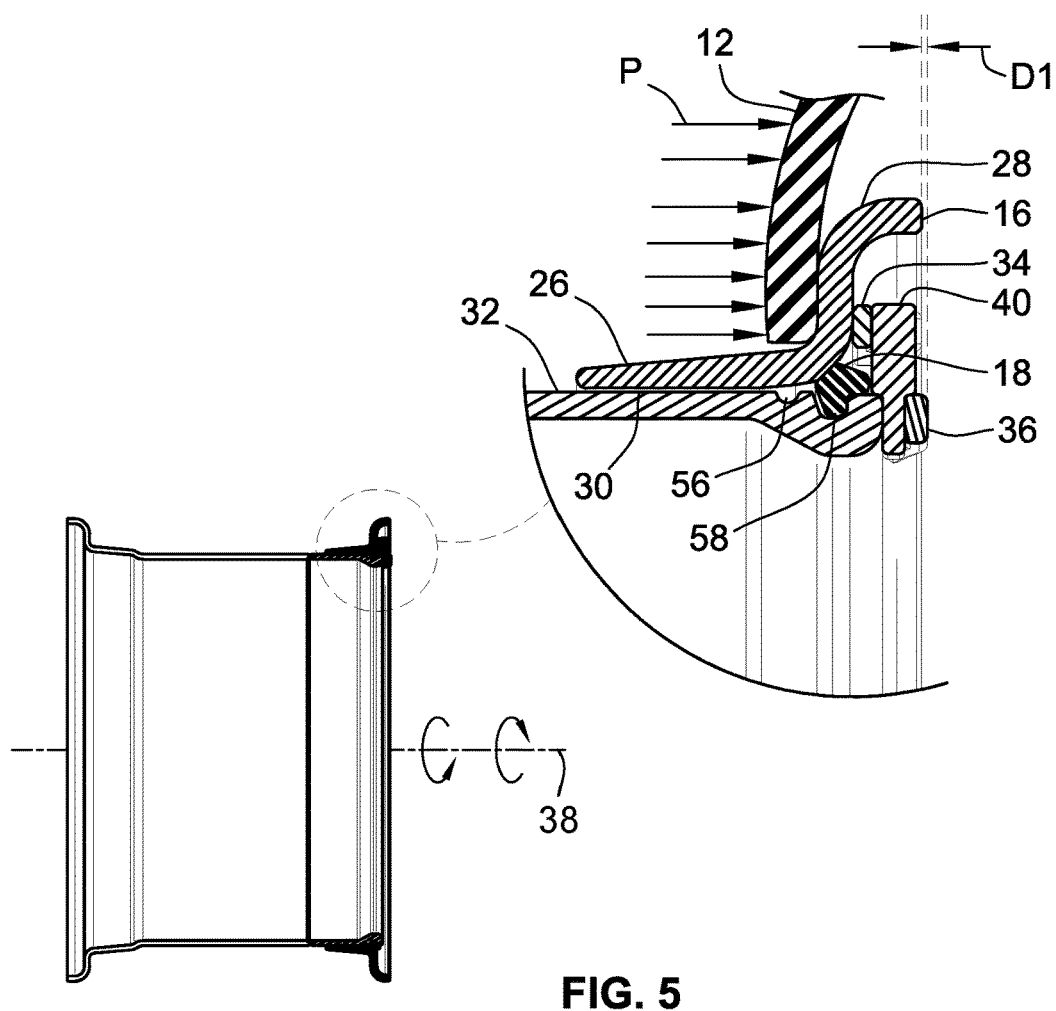
FIG. 5 illustrates a partial view of the wheel assembly of FIG. 1.

Turning now to FIG. 5, the same illustrates a cross-section of the above-described assembly. As can be seen therein, flange member 16 is fully seated against locking ring 18. Locking ring 18 is partially seated within locking groove 58 as illustrated, thereby preventing further axial movement of flange member 16 relative to rim 14. As can also be seen in FIG. 5, an additional seal groove 56 may also be included along an outer periphery of rim 14 which can include a seal to minimize or prevent the ingress of moisture between flange member 16 and rim 14 which could otherwise ultimately lead to the undesirable condition of moisture within the interior of tire 12.

As can also be seen in FIG. 5, locking arrangement 20 advantageously provides a low profile design in comparison to those prior designs described above. More specifically, an outermost axial extent of locking arrangement 20 (defined by inner locking bar 36) is substantially adjacent to an outermost axial extent of flange member 16 in the axial direction. "Substantially adjacent" in the axial direction as used herein means that there is less than a 20 millimeter (mm) distance taken in the axial direction between the aforementioned axial extents. While inner locking bar 36 is illustrated as defining the outermost axial extent of locking arrangement 20, in other embodiments outer locking bar 34 or locking key 40 may define this axial extent.

While the aforementioned axial extents are shown substantially adjacent one another with the axial extent of locking arrangement 20 extending axially beyond the axial extent of flange member 16, it is also possible for the axial extent of flange member 16 to be substantially adjacent to the axial extent of locking arrangement 20 by extending beyond locking arrangement 20 in the axial direction. As such, the dimension D1 in FIG. 5 illustrating the axial extent of locking arrangement 20 as the axially outermost datum is for example only, as the axial extent of flange member 16 may also serve as the axially outermost datum of D1. Therefore, reference herein to the axial extents being "axially spaced" from one another should be taken to encompass either of the flange member 16 extending axially beyond locking arrangement 20 or vice versa.

In a certain configurations, the aforementioned axial extents are axially spaced less than 10 mm from one another. In a more preferable configuration, the aforementioned axial extents are axially spaced 2 mm from one another. This dimension D1 may vary in other embodiments, but in all cases, is significantly less than those prior designs described above.

Figure 6:
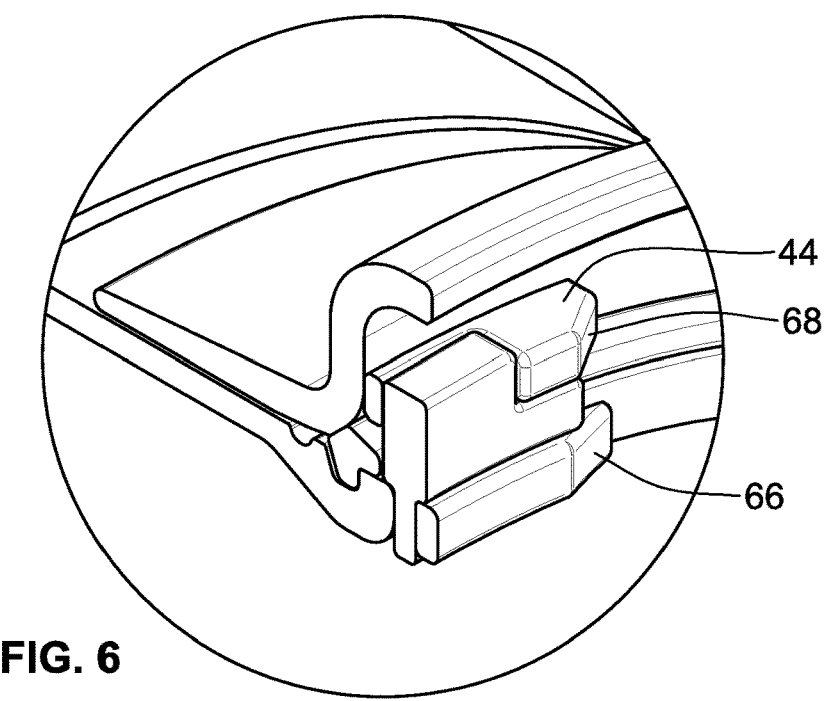
FIG. 6 illustrates a prospective cross-section of the wheel assembly of FIG. 1.

Turning now to FIG. 6, as another advantage of locking arrangement 20 the projections 44 of outer locking bar 34 each include a tapered surface 68. Likewise, inner locking bar includes tapered surfaces 66 at opposed ends thereof (See also FIG. 3). As can be seen in FIG. 6, these tapered surfaces 66, 68 taper axially inward from the axial outermost face of their respective structure. Despite the above-described minimal axial projection defined by dimension D1, these tapered surfaces allow for accommodating an otherwise potential interference with locking arrangement 20 and an adjacent structure. That is, tapered surfaces 66, 68 advantageously provide a smooth tapered transition as locking arrangement 20 encounters any obstruction. This is an advantage over prior designs which typically incorporate generally squared-off ends of their locking arrangements.

As described herein, wheel assembly 10 and its associated locking arrangement 20 advantageously provide improvements over prior designs by presenting a low profile locking arrangement which eliminates or substantially reduces the occurrence of interference with adjacent structures during operation of a vehicle employing wheel assembly 20. These and other advantages of the invention will be readily understood from the disclosure herein.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A wheel assembly, comprising:
   a rim configured to receive a tire;
   a flange member slidably received on said rim, the flange member having a flange portion with a terminal end defining a first axial extent of the flange member, the flange portion integrally formed with the flange member;

a locking ring radially and axially interposed between said rim and flange member;

a locking arrangement mounted between the rim and the flange member and having a second axial extent, wherein the second axial extent is substantially adjacent to the first axial extent in an axial direction;

wherein the locking arrangement includes a radially outer locking bar, a radially inner locking bar, and a locking key received by both of the radially outer and inner locking bars such that rotation of the outer locking bar relative to the inner locking bar is prevented;

wherein the radially outer locking bar is fixedly attached to the flange portion, wherein first and second axial extents are axially spaced less than 10 millimeters from one another.

2. A wheel assembly, comprising:

a rim configured to receive a tire;

a flange member slidably received on said rim, the flange member having a flange portion with a terminal end defining a first axial extent of the flange member, the flange portion integrally formed with the flange member;

a locking ring radially and axially interposed between said rim and flange member;

a locking arrangement mounted between the rim and the flange member and having a second axial extent, wherein the second axial extent is substantially adjacent to the first axial extent in an axial direction;

wherein the locking arrangement includes a radially outer locking bar, a radially inner locking bar, and a locking key received by both of the radially outer and inner locking bars such that rotation of the outer locking bar relative to the inner locking bar is prevented; and wherein the radially outer locking bar is fixedly attached to the flange portion, wherein the first and second axial extents are axially spaced 2 millimeters from one another.

3. The wheel assembly of claim 1, wherein the rim includes a base portion and a contact portion, wherein the contact portion has a reduced wall thickness relative to the base portion.

4. The wheel assembly of claim 1, wherein the locking ring has a generally V-shaped cross section.

5. The wheel assembly of claim 4, wherein the rim includes a base portion and a contact portion, wherein the contact portion includes a locking ring groove adjacent an axial extent of the rim, the locking ring groove extending circumferentially around the contact portion.

6. The wheel assembly of claim 5, wherein a portion of the locking ring is received in the locking ring groove.

7. The wheel assembly of claim 1, wherein the radially outer locking bar is fixedly mounted to the flange member, and wherein the radially inner locking bar is fixedly mounted to the rim.

8. The wheel assembly of claim 7, wherein the radially outer locking bar includes an open sided aperture such that a portion of the locking key is axially insertable into the open sided aperture.

9. The wheel assembly of claim 8, wherein the radially inner locking bar includes a closed-sided aperture such that the locking key is radially insertable into the closed-sided aperture.

10. The wheel assembly of claim 1, wherein each of the radially outer and radially inner locking bars includes tapered portions which taper axially inwardly from respective axially outer facing surfaces of the radially outer and radially inner locking bars.

11. A wheel assembly, comprising:

a rim configured to receive a tire;

a flange member slidably received on said rim;

a locking ring interposed between said rim and flange member;

a locking arrangement mounted between the rim and the flange member, the locking arrangement configured to prevent relative rotation between the rim and the flange member, wherein the locking arrangement includes tapered portions which taper axially inwardly from axial outer-most faces of said locking arrangement;

wherein the locking arrangement includes a radially outer locking bar, a radially inner locking bar, and a locking key received by both of the radially outer and inner locking bars such that rotation of the outer locking bar relative to the inner locking bar is prevented; and wherein the tapered portions are formed on both the radially outer locking bar and the radially inner locking bar, wherein a first axial extent of the flange member is axially spaced from a second axial extent of the locking arrangement by less than 10 millimeters from one another.

12. A wheel assembly, comprising:

a rim configured to receive a tire;

a flange member slidably received on said rim;

a locking ring interposed between said rim and flange member;

a locking arrangement mounted between the rim and the flange member, the locking arrangement configured to prevent relative rotation between the rim and the flange member, wherein the locking arrangement includes tapered portions which taper axially inwardly from axial outer-most faces of said locking arrangement;

wherein the locking arrangement includes a radially outer locking bar, a radially inner locking bar, and a locking key received by both of the radially outer and inner locking bars such that rotation of the outer locking bar relative to the inner locking bar is prevented; and wherein the tapered portions are formed on both the radially outer locking bar and the radially inner locking bar, wherein the first and second axial extents are axially spaced 2 millimeters from one another.

13. The wheel assembly of claim 11, wherein the radially outer locking bar is fixedly mounted to the flange member, and wherein the radially inner locking bar is fixedly mounted to the rim.

14. The wheel assembly of claim 11, wherein the radially outer locking bar includes an open sided aperture such that a portion of the locking key is axially insertable into the open sided aperture.

15. The wheel assembly of claim 14, wherein the radially inner locking bar includes a closed-sided aperture such that the locking key is radially insertable into the closed-sided aperture.

* * * * *